No. 687,397. Patented Nov. 26, 1901.
G. A. FARRALL & C. MAUL.
METALLIC WHEEL.
(Application filed Jan. 12, 1901.)
(No Model.)
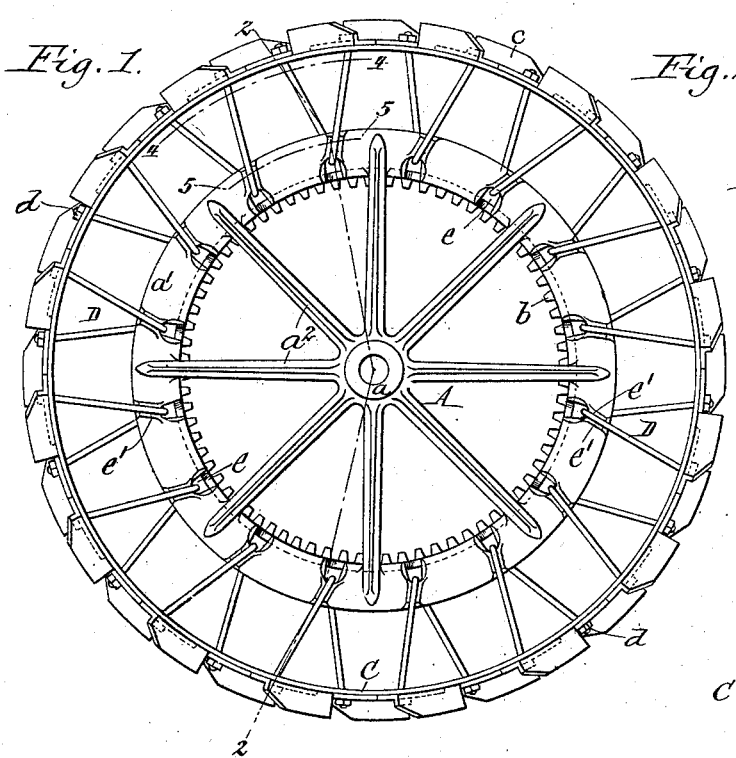
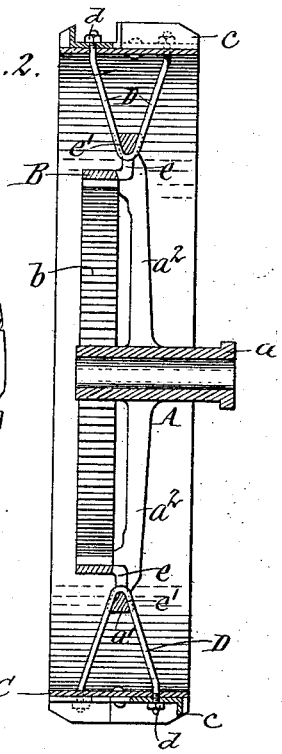
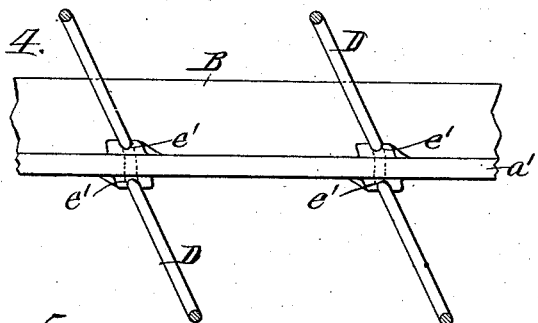
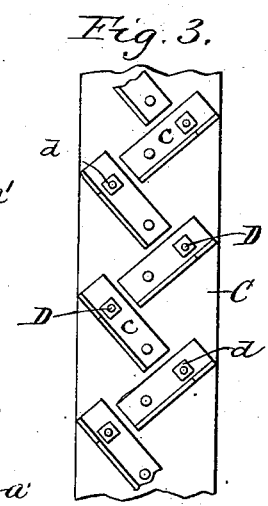
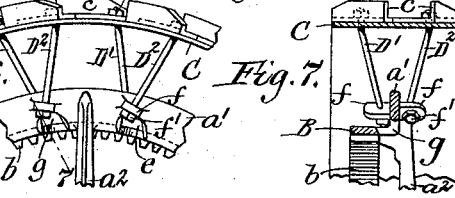
Witnesses:
Henry L. Dick.
F. F. Scherzinger.
Geo. A. Farrall
Christian Maul
Inventors
By Wilhelm Bonner
Attorneys.

UNITED STATES PATENT OFFICE.

GEORGE ALBERT FARRALL AND CHRISTIAN MAUL, OF BATAVIA, NEW YORK, ASSIGNORS TO THE JOHNSTON HARVESTER COMPANY, OF BATAVIA, NEW YORK.

METALLIC WHEEL.

SPECIFICATION forming part of Letters Patent No. 687,397, dated November 26, 1901.

Application filed January 12, 1901. Serial No. 42,943. (No model.)

*To all whom it may concern:*

Be it known that we, GEORGE ALBERT FARRALL and CHRISTIAN MAUL, citizens of the United States, and residents of Batavia, in the county of Genesee and State of New York, have invented a new and useful Improvement in Metallic Wheels, of which the following is a specification.

This invention relates more particularly to the metallic wheels which are used as the traction or master wheels of grain-harvesters, traction-engines, &c.; but the invention may also be embodied in wheels for other purposes.

The master-wheels of grain-harvesters usually consist of a cast-iron center or spider, a wrought-iron tread or face rim, and wrought-iron spokes connecting the center or spider with the face-rim.

The object of this invention is to produce a strong and rigid wheel of this character in which the face-rim is braced by the spokes both circumferentially or in the plane of the wheel and transversely or in the axial line of the wheel.

In the accompanying drawings, Figure 1 is a side view of a traction-wheel embodying our improvement. Fig. 2 is a cross-section thereof in line 2 2, Fig. 1. Fig. 3 is a fragmentary face view of the tread of the wheel. Figs. 4 and 5 are fragmentary circumferential sections, on an enlarged scale, taken in lines 4 4 and 5 5, Fig. 1, respectively. Fig. 6 is a fragmentary side elevation of a modified construction of our improved wheel. Fig. 7 is a transverse section thereof in line 7 7, Fig. 6.

Like letters of reference refer to like parts in the several figures.

Referring to Figs. 1 to 5, A represents the cast center or spider of the wheel, which consists of a hub $a$, a rim $a'$, and connecting-spokes $a^2$, all cast in one piece.

B represents an annular driving-flange, which is arranged along the inner edge of the spider-rim. The motion of the traction-wheel is transmitted to the driven mechanism from this driving-flange by suitable means—for instance, by gear-teeth $b$, arranged on the inner side of the driving-rim, as shown in Figs. 1 and 2.

C represents the tread or face rim of the wheel, which is arranged concentric with the spider and at a suitable distance outwardly from the spider-rim. This tread is provided on its outer side with the usual traction-calks $c$.

D represents the spokes, which connect the spider-rim $a'$ and the face-rim C. The spokes are preferably made in pairs, each pair being formed out of a single rod of wrought metal, which is bent at its middle substantially into the shape of the letter V and passed through a transverse opening $e$ in the spider-rim. The outer ends of the spokes pass through radial holes in the face-rim and calks and are secured thereto by screw-nuts $d$, applied to the outer ends of the spokes. The bight of each pair of connected spokes is drawn against the outer side of the opening $e$ of the spider-rim, while those parts of the spokes which are adjacent to the bight rest in seats $e'$, which are formed on opposite sides of the spider-rim. The spokes of each pair diverge outwardly from the bight or bent middle portion both in a circumferential and in a transverse direction, so that each spoke is arranged in a plane which intersects the radial line as well as the axial line of the wheel at an oblique angle. This arrangement of the spokes braces the face-rim in two directions, circumferentially or in the plane of the wheel and transversely or in the axial line of the wheel, and holds the face-rim rigidly in place with reference to the spider, thereby producing a traction-wheel of great strength and rigidity and permits the parts of the wheel to be made comparatively light, whereby the weight and cost of the wheel are correspondingly reduced.

The internal gear-teeth $b$ of the driving-flange are offset or arranged at a short distance laterally from the spider-rim, so that they do not obstruct the openings $e$, through which the bifurcated spokes pass. These openings are sufficiently large to permit each pair of spokes to be easily inserted from the inner side of the spider-rim or withdrawn inwardly, whereby any pair of spokes can be removed from the wheel without disturbing the other spokes, thereby permitting a broken spoke to be replaced without dismembering the wheel for that purpose.

In the modified construction of our wheel shown in Figs. 6 and 7 the spokes D' D² on opposite sides of the spider are not connected or made in pairs, but are separate from each other. In this construction each spoke is arranged with its inner end in a lug $f$ on the spider-rim and is provided with a head $f'$, which is drawn against the inner side of the lug. An opening $g$ is formed at the junction of the spider-rim and driving-flange underneath each spoke D', which stands outside of the driving-flange. If such a spoke should become broken, it could be removed through this opening $g$ and a new spoke inserted.

We claim as our invention—

1. The combination with the wheel-spider, and the surrounding face-rim, of connecting-spokes which diverge from the spider laterally to the rim and which at their outer parts are arranged in planes intersecting the wheel-axis at an oblique angle, substantially as set forth.

2. The combination with the wheel-spider, and the surrounding face-rim, of connecting-spokes arranged in pairs, the two spokes of which are arranged on opposite sides of the wheel-spider and diverge from the same laterally and also circumferentially to the face-rim, substantially as set forth.

3. The combination with the wheel-spider having spoke-openings, and the surrounding face-rim, of connecting-spokes formed in pairs in which the spokes of a pair are bent of a single rod which is arranged with its bent middle portion in the spoke-opening in the spider, and from which the two spokes diverge both laterally and circumferentially, substantially as set forth.

4. The combination with the face-rim of a wheel, and the wheel-spider having its rim provided with transverse spoke-openings and with a spoke-seat on each side, of connecting-spokes formed in pairs and having their bent middle portions arranged in said openings of the spider-rim, said spokes resting in said seats of the spider-rim and diverging from the same to the face-rim both laterally and circumferentially, substantially as set forth.

5. The combination with a wheel-spider, and a surrounding face-rim, of connecting-spokes arranged in pairs, the two spokes of a pair being arranged on opposite sides of the wheel-spider and diverging from the same laterally and also circumferentially toward the face-rim, said pairs of spokes being detachably secured, substantially as set forth.

6. The combination with a wheel-spider having spoke-openings therein, and a surrounding face-rim, of connecting-spokes arranged in pairs, the spokes of a pair being formed of a single rod passed through the spoke-opening in the spider and bent into substantially V shape, the two spokes diverging both laterally and circumferentially from the spider, and means for detachably securing the ends of the spokes to the face-rim, substantially as set forth.

Witness our hands this 2d day of January, 1901.

GEORGE ALBERT FARRALL.
CHRISTIAN MAUL.

Witnesses:
M. J. EARLEY,
H. R. STONE.